Patented Dec. 11, 1945

2,390,679

UNITED STATES PATENT OFFICE 2,390,679

PROCESS FOR TREATING VITAMIN B CONCENTRATES

Aaron Arnold, East Orange, and Carl Bernard Schreffler, Montclair, N. J., assignors to National Oil Products Company, Harrison, N. J., a corporation of New Jersey No Drawing. Application September 5, 1942, Serial No. 457,454

9 Claims. (Cl. 167—81)

This invention relates to the production of the vitamin B complex and more particularly to a process of de-bittering vitamin B complex concentrates derived from natural sources.

Concentrates of the vitamin B complex are prepared at the present time by extracting vitamin B complex source materials with aqueous or aqueous alcoholic solvents. When such concentrates are prepared from suitable cereals the extracts usually contain various inert materials such as carbohydrates, proteins, mucilaginous substances, etc. These inert materials are conveniently removed by heating the concentrate to a temperature of about 65° C. or above and/or adjusting the pH value of the extract to the isoelectric point of the proteins contained therein to precipitate the same. These coagulated or precipitated materials are then readily removed from the concentrate by centrifugation, decantation, etc. However, the removal of these inert materials does not remove various bitter taste imparting bodies from the extracts and consequently the palatabilities of the extracts are unsatisfactory.

Vitamin B complex concentrates are also prepared from yeast, particularly brewer's yeast, by extracting the same with various aqueous alcoholic solvents, e. g., 90% methanol. On removal of the solvent from the extract a high potency vitamin B complex material is obtained. In most cases, such materials contain therein certain gums and other undesirable inert materials. These gums and other materials may be removed therefrom by filtration, precipitation with alkaline earth metals, etc. It has been claimed that the removal of these gummy materials from extracts of brewer's yeast will produce extracts which are free of bitter tastes, it being claimed that the gummy materials are responsible for the bitter tastes in vitamin B concentrates. However, such extracts are also unsatisfactory as far as the taste thereof is concerned. It is definitely known that in the case of extracts prepared from cereal grains that gummy materials are not responsible for the bitter tastes of such extracts since the taste remains after the removal of these materials.

It is the object of this invention to provide vitamin B complex concentrates characterized by being free of undesirable bitter taste.

Another object of this invention is to provide a process for removing bitter taste imparting bodies from vitamin B complex concentrates.

Other objects of the invention will in part be obvious and will in part appear hereinafter.

We have discovered that vitamin B complex concentrates prepared by extracting natural vitamin B source materials with aqueous or alcoholic solvents may be effectively freed of bitter taste imparting bodies by extracting the same with a water-immiscible fat solvent. It has been found that the principles which impart the undesirable bitterness to such concentrates are miscible with such fat solvents while the concentrates are immiscible therewith. Consequently, such solvents dissolve out and extract the bitter taste imparting bodies from the vitamin B complex concentrates leaving a highly desirable product which is completely free of bitter taste. The chemical nature of these bitter substances has not, as yet, been determined, but it is known, however, that they are very concentrated materials since, in most instances, the residue obtained on evaporating the solvent, after separating the solvent solution from the vitamin complex extract, is usually less than about 0.1% based on the vitamin B complex concentrate treated.

The vitamin B complex concentrates to be treated by the process of the invention may be prepared from any natural vitamin B complex-containing material. Preferably such concentrates are prepared from cereals containing the vitamin B complex, e. g., rice bran, rice polishings, wheat germ, wheat bran, maize germ, etc.

When extracts of cereals are employed, such extracts may be prepared by any convenient process; thus the well-known process of extracting such cereals with an aqueous or alcoholic solvent, subsequently removing inert materials from the extract by coagulation and precipitation thereof and removing the same by filtration or other convenient means, and then concentrating the extract to the desired specific gravity may be employed. In such cases any gums or similar materials therein are removed from the extract along with the other inert materials which are coagulated or precipitated and then removed by filtration. A much simplified process which may be employed for preparing the vitamin B complex concentrates is disclosed and claimed in the copending application of Howard B. Colman, Serial No. 410,263, filed September 10, 1941, now Patent No. 2,369,775, granted February 20, 1945. By the process disclosed in that application a vitamin B complex source material is freed of fatty material by extraction with a water-miscible fat-solvent, e. g., acetone, isopropanol, etc., then the major portion of such solvent is removed from the vitamin B complex containing material, leaving the substantially fat-free material wet with the remaining solvent; thereafter the material is extracted while still wet with solvent, with an aqueous extractant, the residual solvent dissolving in the extractant and, when so dissolved, acting to suppress extraction of inert substances, including gums and similar materials while permitting the extraction of the vitamin B complex; and finally removing the aqueous extract and evaporating the same to produce a vitamin B concentrate of high potency. If desired, the aqueous extract may be filtered, e. g. through a filter press or other suitable means, before concentrating the extract in order to insure complete removal of gums and other inert materials. For further information concerning the Colman process reference may be had to the above-identified application.

According to the present invention any one of a large number of water-immiscible fat solvents may be employed in extracting the vitamin B complex concentrate to remove the bitter taste imparting bodies therefrom. Thus, both aliphatic and aromatic fat solvents may be employed examples of which include, inter alia, heptane, hexane, octane, nonane, petroleum ether, benzene, ethyl ether, cyclohexane, ethylene dichloride, chloroform, trichlorethylene, carbon tetrachloride, methylene chloride, etc., or any suitable mixture of these and similar solvents.

In carrying out the extraction of the vitamin B complex concentrates in accordance with the process of our invention, any suitable extraction process may be employed; thus a countercurrent process, a batch process or a continuous extraction process may be used. When carrying out the extraction by a batch process, the relative proportion of solvent to concentrate may vary considerably. However, in most instances, at least five parts of solvent by volume should be employed per one hundred parts of concentrate, and much larger amounts of solvent, i. e. up to equal parts or more of solvent based on the concentrate may be employed if desired. A suitable ratio of solvent to concentrate considering the economics of the process is one part of solvent to ten of concentrate. Preferably at least two extractions and in some cases four or five extractions should be made when a batch extraction process is utilized. When carrying out the extraction continuously whereby the solvent is recirculated through the concentrate, similar ratios of solvent and concentrate may be employed. However, in most instances, it is preferred to use about one part of solvent to four or five parts of concentrate in such processes. The extraction may be carried out at any temperature at which the concentrate is fluid. However, in most instances, it is preferred to regulate the fluidity of the concentrate by either removing water therefrom or adding water thereto and then carrying out the extraction at room temperature.

The specific gravity of the concentrate to be treated by the process of the invention will vary depending on the fluidity thereof as above mentioned and also upon the solvent which is to be employed and the method to be used in the removal of the solvent from the extracted concentrate. For example, if a solvent having a relatively high specific gravity, e. g. ethylene dichloride, is employed, the specific gravity of the vitamin concentrate may be adjusted so that it is greater than that of the ethylene dichloride whereby the ethylene dichloride may then be removed at the top of the vessel in which the extraction is being carried out. If it is desired to remove the ethylene dichloride from the bottom of the vessel in which the extraction is being made, the specific gravity of the concentrate may be lowered by dilution with water so that the concentrate will be lighter than the solvent. Thus, in any case, the specific gravity of the concentrate may be so adjusted that the most efficient separation of the solvent therefrom may be effected.

After separating the solvent from the concentrate, the concentrate is then preferably adjusted to a specific gravity of about 1.35 and since, in practically every case, the specific gravity of the treated concentrate will be less than that, it will be necessary to remove a certain amount of water from the concentrate by evaporation, preferably under reduced pressure. While so removing the excess water, any residual solvent which may be retained in the concentrate will also be removed. It will be found that a highly desirable concentrate of the vitamin B complex entirely free of any undesirable bitter tastes is accordingly produced.

For a fuller understanding of the nature and objects of the invention reference should be had to the following examples which are given merely to further illustrate the invention and are not to be construed in a limiting sense, all parts being by volume unless otherwise specified.

Example I

An aqueous extract of rice bran which had been freed of inert materials by precipitation thereof and removal of the precipitated materials by filtration, was adjusted to a specific gravity of 1.3. 1800 parts of this vitamin B complex concentrate were placed in a continuous extraction apparatus having a capacity of 2000 parts, and sufficient ethylene dichloride added to bring the solvent up to the return side arm. About 500 parts of ethylene dichloride were placed in a round bottom flask, connected to the extraction apparatus and the continuous extractor allowed to operate overnight. On separating the solvent from the vitamin B complex concentrate, it was found that it was free of bitter taste and that the palatability of the vitamin concentrate was considerably enhanced considering the original concentrate. The resulting concentrate was acidified to a pH value of 4.0 without appreciably affecting the palatability thereof. Such increased acidity aids considerably in maintaining the stability of the vitamins in the concentrate and particularly the Vitamin $B_1$.

Example II 500 parts of a vitamin B complex concentrate prepared from rice bran and which had a specific gravity of 1.15 were placed in a continuous extraction apparatus similar to that employed in Example I and extracted for 4 hours with 100 parts of ethyl ether. The solvent was then removed from the aqueous vitamin B complex concentrate and the solution concentrated to a specific gravity of about 1.35. The resulting product was a pleasant-tasting syrup which was much more palatable than the original concentrate. Upon evaporating the solvent from the solvent extract, an extremely bitter residue was obtained. This residue was less than 0.012% of the vitamin B complex concentrate thus clearly illustrating how highly bitter the principles are which impart the bitter taste to the untreated concentrate.

Example III 500 parts of a vitamin B complex concentrate were extracted similarly as in Example II except that 50 parts of heptane were employed in place of the ethyl ether. After removal of the solvent it was found that the palatability of the vitamin concentrate was definitely superior to that of the starting material.

*Example IV*

500 parts of vitamin B complex concentrate prepared from rice bran were shaken for one-half hour with 50 parts of ethyl ether. Five such extractions were carried out. After the removal of the ether following the last extraction, the vitamin concentrate was adjusted to a pH of 4 with tartaric acid. The palatability of the vitamin concentrate was greatly superior to that of the starting material when similarly acidified.

Since the concentrates treated by the process of the invention are entirely free of bitter tastes, the pH of the concentrates may be lowered considerably below that which is permissible with the untreated concentrates. The reason for this is that the concentrates in most instances, particularly concentrates prepared from cereals, contain relatively large percentages of sugars. These sugars tend to counteract the bitter tastes as well as the sour taste imparted to the concentrates due to the acidity thereof and on removal of the bitter principles, the sugars then have only the slightly sour taste due to the acidity to counteract and consequently the acidity of the refined concentrates can be increased considerably. This is a distinct advantage since, as is well-known, the various members of the vitamin B complex, particularly vitamin $B_1$, are much more stable in a more acid medium. Although the acidity of the concentrate may now be increased to a pH of from about 4.5 to 4.0, the palatability of the concentrate is not appreciably affected because the principles which are responsible for the bitterness of the concentrate are no longer present. The removal of these bitter principles also allows a more effective use of a great variety of flavoring agents.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent, is:

1. A process for removing bitter taste principles from vitamin B complex concentrates prepared from natural sources which comprises extracting an aqueous cereal concentrate substantially free from water-insoluble gummy constituents with a water-insoluble organic fat solvent until substantially all the bitter taste principles are dissolved and removing the organic solvent solution of the extracted matter from the refined concentrate.

2. A process for removing bitter taste principles from vitamin B complex concentrates prepared from natural sources which comprises extracting an aqueous rice bran concentrate substantially free from water-insoluble gummy constituents with a water-immiscible organic fat solvent until substantially all the bitter taste principles are dissolved and removing the organic solvent solution of the extracted matter from the refined concentrate.

3. A process for removing bitter taste imparting bodies from vitamin B complex concentrates prepared from natural sources which comprises extracting an aqueous cereal concentrate substantially free from water-insoluble gummy constituents with a water-immiscible hydrocarbon fat solvent until substantially all the bitter taste principles are dissolved and removing the hydrocarbon solvent solution of the extracted bitter taste imparting bodies from the refined concentrate.

4. A process for removing bitter taste imparting bodies from vitamin B complex concentrates prepared from natural sources which comprises extracting an aqueous cereal concentrate substantially free from water-insoluble gummy constituents with a water-immiscible halogenated hydrocarbon fat solvent until substantially all the bitter taste principles are dissolved and removing the halogenated hydrocarbon solvent solution of the extracted bitter taste imparting bodies from the refined concentrate.

5. A process for removing bitter taste imparting bodies from vitamin B complex concentrates prepared from natural sources which comprises extracting an aqueous cereal concentrate substantially free from water-insoluble gummy constituents with ethylene dichloride until substantially all the bitter taste principles are dissolved and removing the ethylene dichloride solution of the extracted bitter taste imparting bodies from the refined concentrate.

6. A process for removing bitter taste imparting bodies from aqueous vitamin B complex concentrates prepared from natural sources which comprises extracting an aqueous cereal concentrate substantially free from water insoluble gummy constituents with ethyl ether until substantially all the bitter taste principles are dissolved and removing the ethyl ether solution of the extracted bitter taste imparting bodies from the refined concentrate.

7. A process for removing bitter taste imparting bodies from vitamin B complex concentrates prepared from natural sources which comprises extracting an aqueous rice bran concentrate substantially free from water-insoluble gummy constituents with a water-immiscible hydrocarbon fat solvent until substantially all the bitter taste principles are dissolved and removing the hydrocarbon solvent solution of the extracted bitter taste imparting bodies from the refined concentrate.

8. A process for removing bitter taste imparting bodies from vitamin B complex concentrates prepared from natural sources which comprises extracting an aqueous rice bran concentrate substantially free from water-insoluble gummy constituents with a water-immiscible chlorinated hydrocarbon fat solvent until substantially all the bitter taste principles are dissolved and removing the chlorinated hydrocarbon solvent solution of the extracted bitter taste imparting bodies from the refined concentrate.

9. A process for removing bitter taste imparting bodies from vitamin B complex concentrates prepared from natural sources which comprises extracting an aqueous rice bran concentrate substantially free from water-insoluble gummy constituents with ethylene dichloride until substantially all the bitter taste principles are dissolved and removing the ethylene dichloride solution of the extracted bitter taste imparting bodies from the refined concentrate.

AARON ARNOLD.
CARL BERNARD SCHREFFLER.